(12) United States Patent
Taketani

(10) Patent No.: US 11,307,603 B2
(45) Date of Patent: Apr. 19, 2022

(54) ELECTRONIC APPARATUS AND CONTROL METHOD FOR ELECTRONIC APPARATUS

(71) Applicant: CANON KABUSHIKI KAISHA, Tokyo (JP)

(72) Inventor: Akihito Taketani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/017,825

(22) Filed: Sep. 11, 2020

(65) Prior Publication Data

US 2021/0080988 A1    Mar. 18, 2021

(30) Foreign Application Priority Data

Sep. 13, 2019  (JP) .............................. JP2019-167491

(51) Int. Cl.
  *G02B 6/42* (2006.01)
  *G05F 1/66* (2006.01)

(52) U.S. Cl.
  CPC ............ *G05F 1/66* (2013.01); *G02B 6/4246* (2013.01)

(58) Field of Classification Search
  None
  See application file for complete search history.

(56) References Cited

U.S. PATENT DOCUMENTS

| | | | |
|---|---|---|---|
| 7,589,536 B2 * | 9/2009 | Terlizzi | G06F 13/385 |
| | | | 324/527 |
| 9,223,375 B1 * | 12/2015 | Samorukov | G06F 1/266 |
| 9,276,404 B2 * | 3/2016 | Kayama | H03K 17/223 |
| 9,331,492 B2 * | 5/2016 | Lin | G06F 13/4081 |
| 9,904,338 B2 * | 2/2018 | Wu | G06F 1/26 |
| 9,971,728 B2 * | 5/2018 | Burgers | G06F 13/4072 |
| 10,014,957 B2 * | 7/2018 | Maung | H04B 10/29 |
| 10,712,803 B2 * | 7/2020 | Suganuma | G06F 13/362 |
| 10,761,498 B2 * | 9/2020 | Kim | G06F 1/263 |
| 2011/0150401 A1 | 6/2011 | Furuyama | |
| 2015/0155854 A1 * | 6/2015 | Hayasaka | G06F 1/24 |
| | | | 327/143 |

FOREIGN PATENT DOCUMENTS

| | | |
|---|---|---|
| JP | 4082105 B2 | 4/2008 |
| JP | 5417151 B2 | 2/2014 |

* cited by examiner

*Primary Examiner* — Thomas J. Hiltunen
(74) *Attorney, Agent, or Firm* — Venable LLP

(57) ABSTRACT

An electronic apparatus comprises a detection unit configured to detect electrical characteristics of main power, via a composite cable, changed in accordance with subsidiary power supplied through the composite cable configured to perform power supply and bi-directional signal transmission; and a control unit configured to control the main power supplied through the composite cable in accordance with a result of detection by the detection unit.

7 Claims, 7 Drawing Sheets

FIG. 3A

| GND | Tx1 | Rx1 | Vmain | Vsub | GND | Vsub | Vmain | Rx2 | Tx2 | GND |

FIG. 3B

| GND | Tx1+ | Tx1- | Vmain | Vsub | N.C. | N.C. | N.C. | Vmain | Rx2- | Rx2+ | GND |
| GND | Rx1+ | Rx1- | Vmain | N.C. | N.C. | N.C. | Vsub | Vmain | Tx2- | Tx2+ | GND |

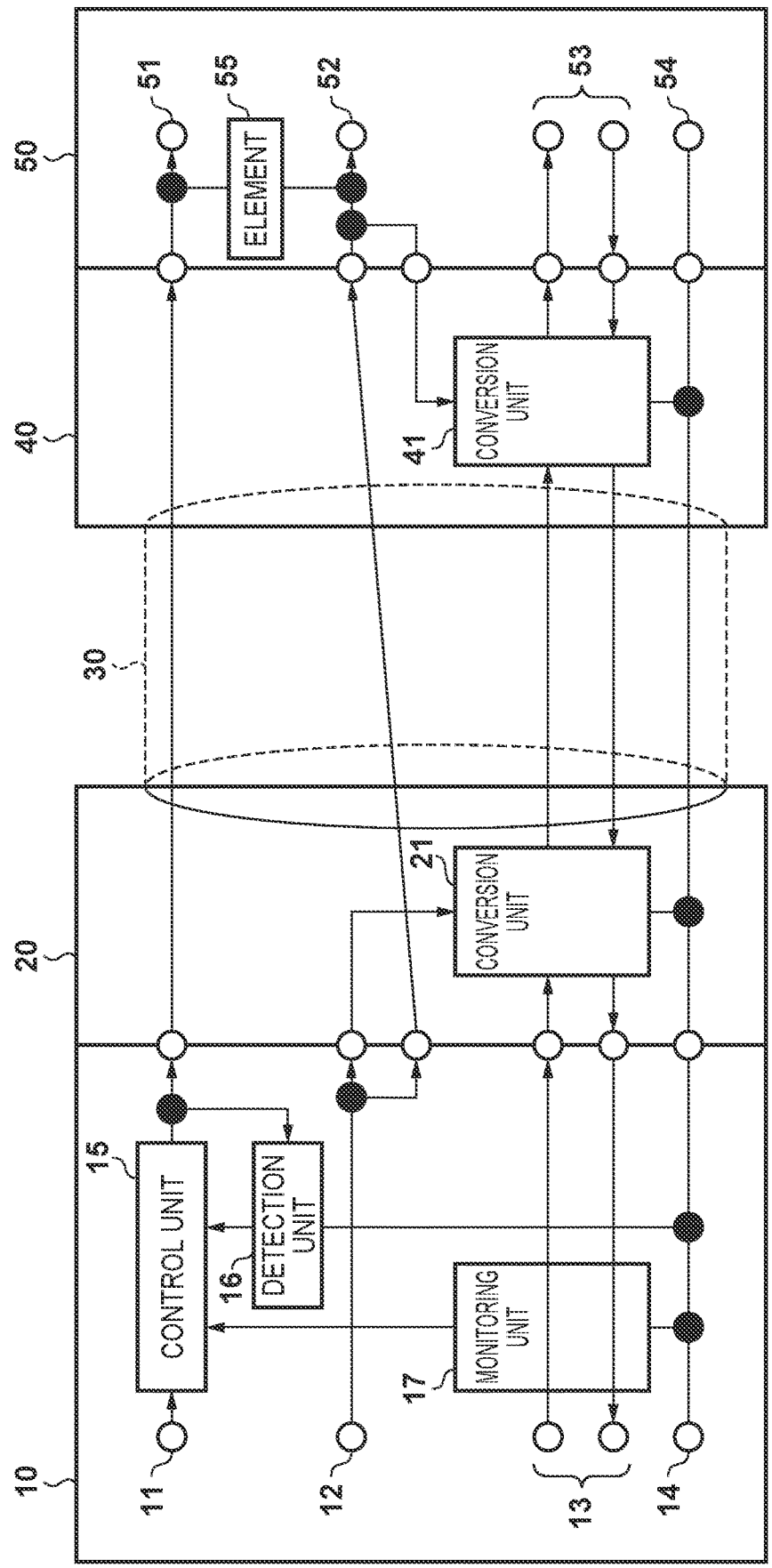

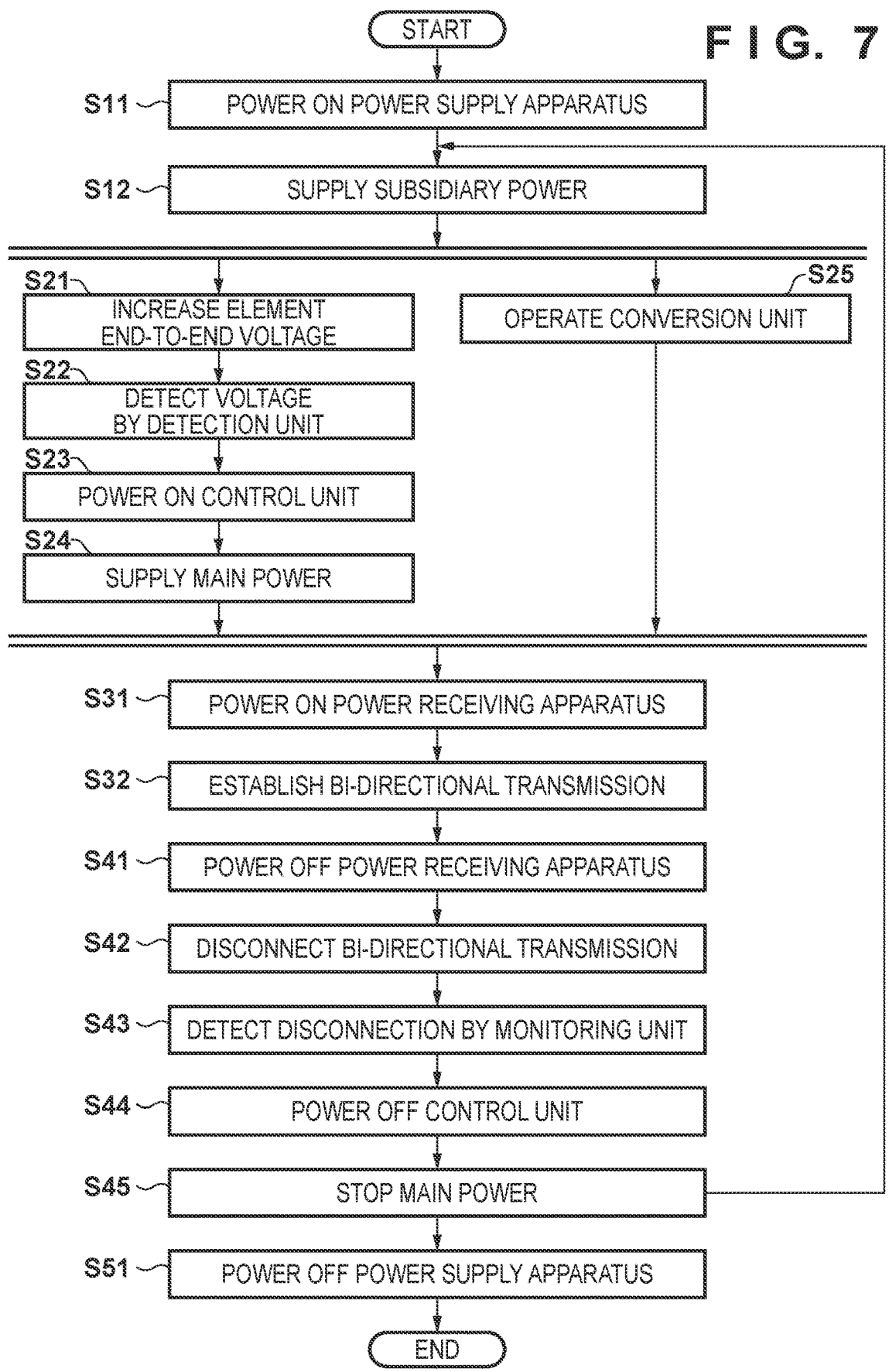

ELECTRONIC APPARATUS AND CONTROL METHOD FOR ELECTRONIC APPARATUS

BACKGROUND OF THE INVENTION

Field of the Invention

The present invention relates to a power control technology using a composite cable performing power supply and bi-directional signal transmission.

Description of the Related Art

In recent years, with improved performance of electronic devices and semiconductors, the operating speed of electronic apparatuses and the amount of data supported by the electronic apparatuses have been increasing. Additionally, in many systems connecting a plurality of electronic apparatuses together, the amount of data transmitted increases, leading to a need for bi-directional signal transmission. Furthermore, for improved convenience for the user, there are a fair number of composite cables available in which one cable is collectively used not only for signal transmission but also for power supply or which enable a cable front and a cable back to be reversely connected or enable a connector to be coupled upside down.

As a technology for realizing the above-described cable, Japanese Patent No. 4082105 is proposed regarding detection of connection of the cable and upside-down coupling of the connector and control of power supply. In addition, Japanese Patent No. 5417151 is proposed regarding transmission of bi-directional signals and control of power supply. Furthermore, as a known technology, universal serial buses have offered increasingly improved convenience on a generation-to-generation basis, and the Type-C standard enables power supply and bi-directional signal transmission, and also enables front-and-back reverse connection and upside-down connection.

On the other hand, all the techniques described above require dedicated control signal lines for detection of cable connection and power control. Additionally, the universal serial bus often requires a complex circuit configuration using a dedicated controller IC to control the power.

SUMMARY OF THE INVENTION

The present invention provides a more convenient power control technology.

According to the first aspect of the present invention, there is provided an electronic apparatus comprising: a detection unit configured to detect electrical characteristics of main power, via a composite cable, changed in accordance with subsidiary power supplied through the composite cable configured to perform power supply and bi-directional signal transmission; and a control unit configured to control the main power supplied through the composite cable in accordance with a result of detection by the detection unit.

According to the second aspect of the present invention, there is provided a control method for an electronic apparatus comprising: detecting electrical characteristics of main power, via a composite cable, changed in accordance with subsidiary power supplied through the composite cable configured to perform power supply and bi-directional signal transmission; and controlling the main power supplied through the composite cable in accordance with a result of the detection.

Further features of the present invention will become apparent from the following description of exemplary embodiments (with reference to the attached drawings).

BRIEF DESCRIPTION OF THE DRAWINGS

FIGS. 3A and 3B are diagrams illustrating examples of a connector pin configuration in the composite cable plug front 20 and a composite cable plug back 40.

FIG. 6 is a block diagram illustrating a configuration with only the composite cable plug front 20 connected upside down.

FIG. 7 is a flowchart of a power control operation performed by an electronic apparatus.

DESCRIPTION OF THE EMBODIMENTS

Figure 1:
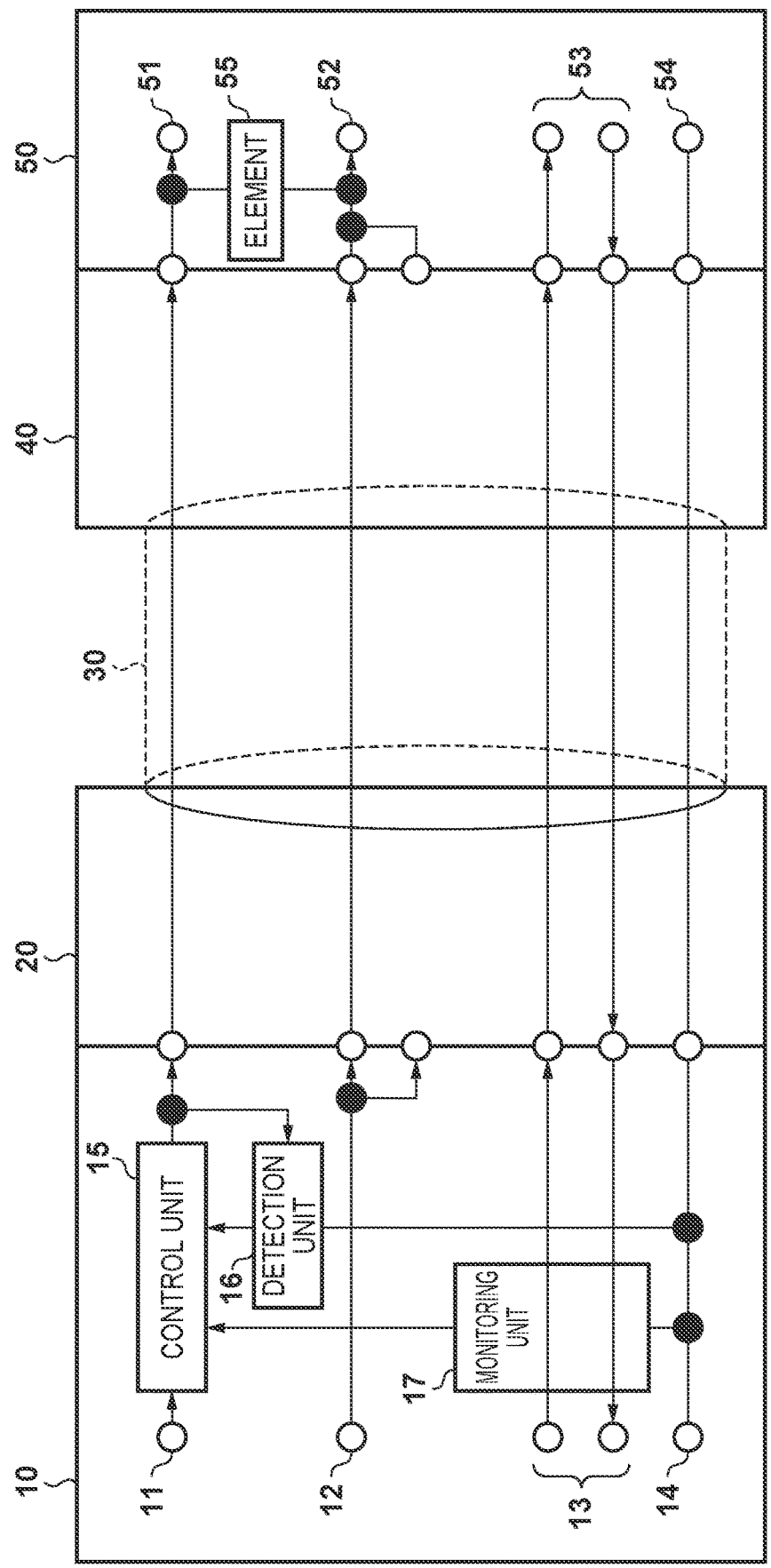
FIG. 1 is a block diagram illustrating a configuration example of an electronic apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

First, a configuration example of an electronic apparatus according to the present embodiment will be described, using a block diagram in FIG. 1. As illustrated in FIG. 1, an electronic apparatus according to the present embodiment includes a power supply apparatus 10 configured as an apparatus that supplies power, a composite cable plug front 20, a composite cable line 30, a composite cable plug back 40, and a power receiving apparatus 50 configured to receive power supplied by the power supply apparatus 10.

First, the power supply apparatus 10 will be described. A control unit 15 controls electrical characteristics of a main power supply line 11 that supplies main power (main supply power). The "electrical characteristics of the main power supply line 11 that supplies main power" include, for example, one or more of the voltage, current, frequency, phase of the main power. Furthermore, the control unit 15 controls the electrical characteristics of the main power supply line 11 in accordance with the result of detection performed by a detection unit 16 described below and the result of the monitoring performed by a monitoring unit 17 described below. In other words, the control unit 15 is a function unit that controls the main power. In a case that the control by the control unit 15 is simply configured, a base or a gate of a transistor may be used to control the voltage and current between a collector and an emitter or between a drain and a source. Alternatively, a load switch may be utilized.

The detection unit 16 is connected to the main power supply line 11 output from the control unit 15 to detect the electrical characteristics of a main power supply line 51 connected to the main power supply line 11 by interposing a composite cable, and to output an instruction to the control unit 15 based on the result of the detection. Note that, depending on an element 55 described below, the detection unit 16 may contain a pull-down resistor using a connection to a ground line 14 described below.

The monitoring unit 17 monitors a transmission status of a signal traveling through a bi-directional transmission line 13 that performs power supply and bi-directional signal transmission, and outputs an instruction to the control unit 15 based on the monitored transmission status. For example, the monitoring unit 17 detects on/off of signal transmission in the bi-directional transmission line 13, and outputs, to the control unit 15, an instruction corresponding to the result of the detection. However, the object monitored by the monitoring unit 17 is not limited to the on/off of the signal transmission in the bi-directional transmission line 13, and may be, for example, a change in data rate in the bi-directional transmission line 13 or a change in state based on the electrical characteristics such as the voltage, current, frequency, and phase.

The composite cable, through which the main power supply line 11, a subsidiary power supply line 12 that supplies the subsidiary power (subsidiary supply power), the bi-directional transmission line 13, and the ground line 14 described below pass, is constituted by a composite cable plug front 20, a composite cable line 30, and a composite cable plug back 40.

The composite cable plug front 20 and the composite cable plug back 40 have similar connector pin configurations (described below), and the operation is unchanged even in a case that the composite cable plug front 20 is inserted into the power receiving apparatus 50 and the composite cable plug back 40 is inserted into the power supply apparatus 10.

With respect to the power, FIG. 1 illustrates only two power lines for the main power and the subsidiary power as power lines. However, the number of power lines is not limited to two, and three or four lines or more may be used to support two or more power lines. A plurality of power lines may be provided that do not include the control of the power, whereas a plurality of lines may be provided for which the supply of power is controlled. Depending on the combination of these power lines, the numbers of control units 15 and detection units 16 also vary. Additionally, FIG. 1 illustrates only one lane of the bi-directional transmission line 13, but the composite cable may include a plurality of lanes of the bi-directional transmission line 13. Additionally, it goes without saying that a plurality of ground lines 14 may be physically provided.

Now, the power receiving apparatus 50 will be described. The element 55 is connected to the main power supply line 51 coupled to the main power supply line 11 output from the control unit 15 (the main power supply line 11 provided in the composite cable) and the subsidiary power supply line 52 coupled to the subsidiary power supply line 12 (the subsidiary power supply line 12 provided in the composite cable). And the element 55 electrically connects the main power supply line 51 and the subsidiary power supply line 52. The element 55 is intended for electrical connection, but may not only be a resistor or a semiconductor but also be an element such as a photocoupler or a reactor in which electrical coupling of an intermediate portion is insulated. In a case that the element 55 is simply configured, a resistor or a diode may be used.

The bi-directional transmission line 53 is coupled to the above-described bi-directional transmission line 13 (the bi-directional transmission lines 13 provided in the composite cable). Additionally, the ground line 54 is coupled to the above-described ground line 14 (the ground line 14 provided in the composite cable).

Note that there may be a plurality of the above-described main power supply lines 51, subsidiary power supply lines 52, bi-directional transmission lines 53, ground lines 54, and elements 55 as described above.

Figure 2:
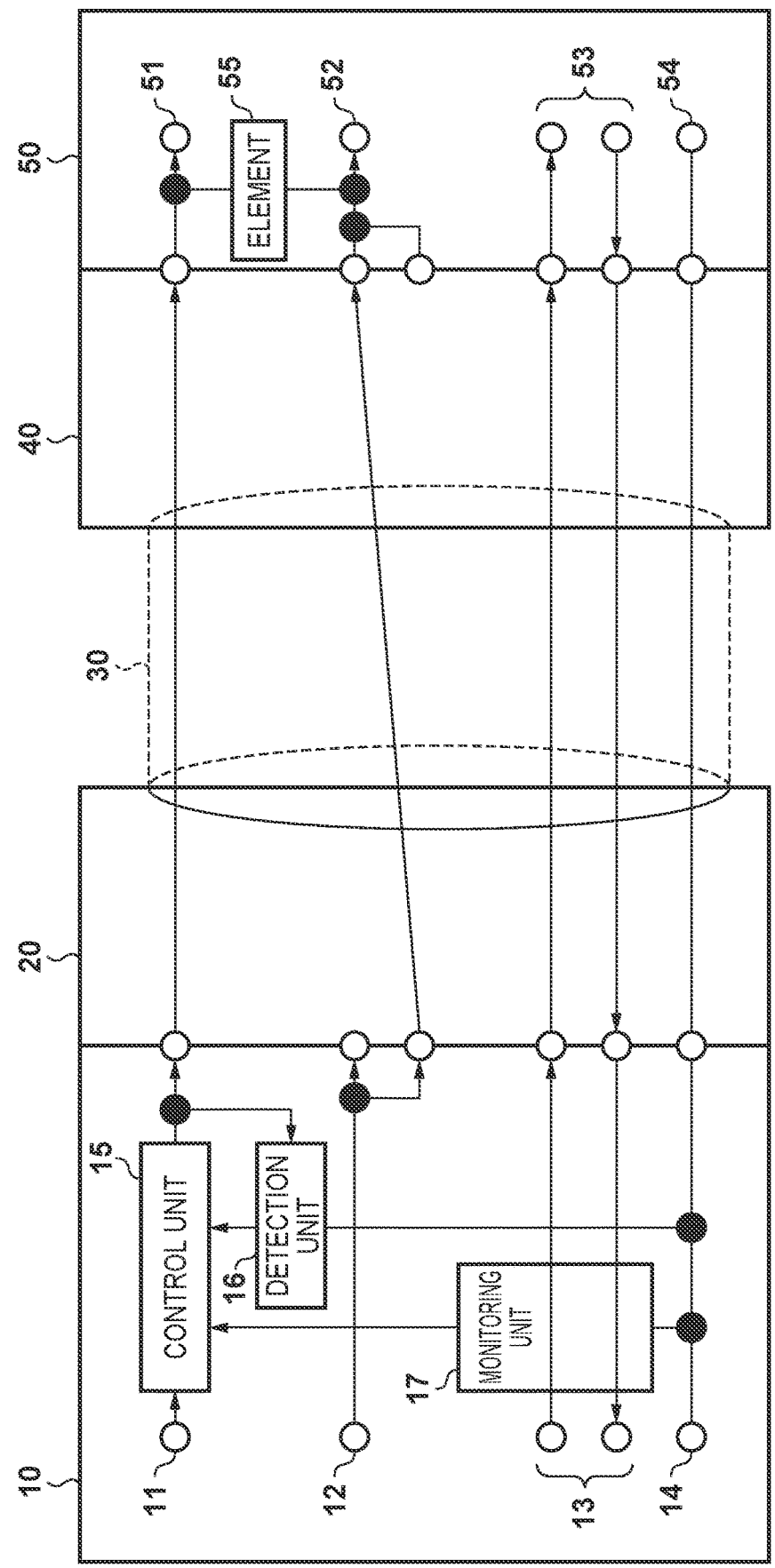
FIG. 2 is a block diagram illustrating a configuration with only a composite cable plug front 20 connected upside down.

FIG. 2 illustrates the configuration in FIG. 1 in which only the composite cable plug front 20 is connected upside down. In the power receiving apparatus 50, a different connector pin of the subsidiary power supply line 12 is connected from the power supply apparatus 10 to the composite cable, but the subsidiary power supply line 52 is connected to the element 55 in the same relationship as that in FIG. 1. Here, only the composite cable plug front 20 is coupled upside down, but even in a case that only the composite cable plug back 40 is coupled upside down, the subsidiary power supply line 12 remains connected to the subsidiary power supply line 52. Furthermore, the same applies to a case where both the composite cable plug front 20 and the composite cable plug back 40 are coupled upside down. Additionally, it is acceptable to replace the composite cable plug front 20 with the composite cable plug back 40 as described above.

FIGS. 3A and 3B illustrate examples of the connector pin configuration in the composite cable plug front 20 and the composite cable plug back 40. FIG. 3A illustrates an example of a one-row connector pin configuration, and FIG. 3B illustrates an example of a two-row connector pin configuration.

In the example in FIG. 3A, the pins are arranged in the order of GND, Tx1, Rx1, Vmain, Vsub, GND, Vsub, Vmain, Rx2, Tx2, and GND from left to right. Here, the main power supply line is denoted by Vmain, the subsidiary power supply line is denoted by Vsub, the bi-directional transmission lines are denoted by Tx (Tx1 and Tx2) and Rx (Rx1 and Rx2), and the ground line is denoted by GND.

In the example in FIG. 3B, in the upper row, the pins are arranged in the order of GND, Tx1+, Tx1−, Vmain, Vsub, N.C., N.C., N.C., Vmain, Rx2−, Rx2+, and GND from left to right. Additionally, in the lower row, the pins are arranged in the order of GND, Rx1+, Rx1−, Vmain, N.C., N.C., N.C., Vsub, Vmain, Tx2−, Tx2+, and GND from left to right. In this case, the main power supply line is denoted by Vmain, the subsidiary power supply line is denoted by Vsub, the bi-directional transmission lines are denoted by Tx1+, Tx1−, Tx2+, Tx2−, Rx1+, Rx1−, Rx2+, and Rx2−, and the ground line is denoted by GND.

A large number of technologies already exist for connector pin configurations that can be connected upside down, and thus, in the present embodiment, the connector pin configuration is not limited to those illustrated in FIGS. 3A and 3B. In other words, the examples illustrated in FIGS. 3A and 3B may be used, and a connector pin configuration that is more complex and redundant than those in FIGS. 3A and 3B may be used. However, connector pins are symmetrically arranged to enable upside-down connection.

Figure 4:
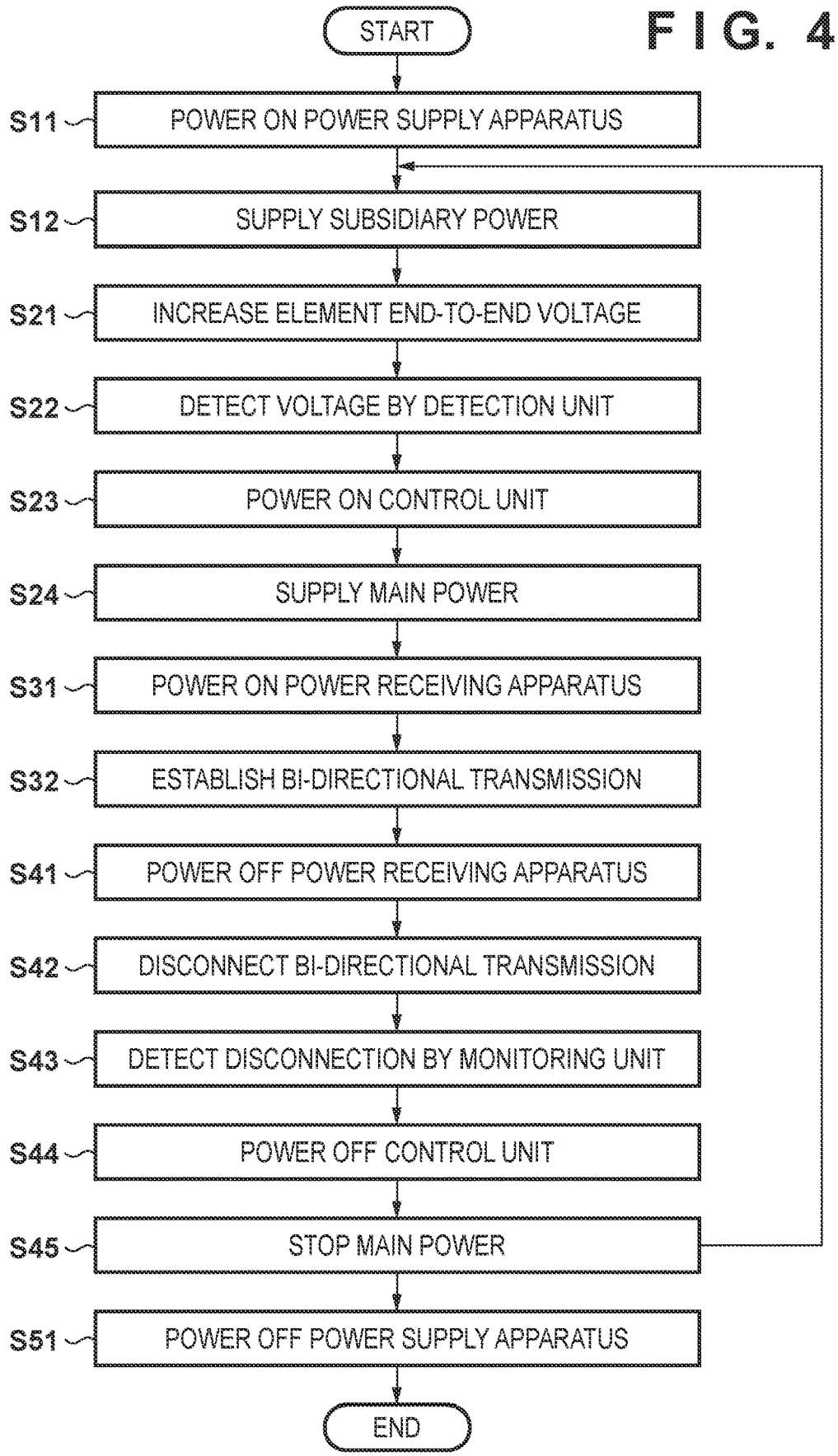
FIG. 4 is a flowchart of a power control operation performed by an electronic apparatus.

Now, a power control operation performed by an electronic apparatus according to the present embodiment will be described with reference to a flowchart in FIG. 4.

In step S11, the power supply apparatus 10 is powered on. This increases the voltage of the main power supply line 11 (voltage of the main power) and the voltage of the subsidiary power supply line 12 (voltage of the subsidiary power). A technique for powering on the power supply apparatus 10 is not limited to a specific technique, and, for example, powering on from an external power source, powering on by a switch, or powering on by software control may be used to power on the power supply apparatus 10.

Here, even in a case that the power supply apparatus 10 is powered on, the control unit 15 outputs nothing to the main power supply line 11. For simple control described below, it is assumed that a Tx of the bi-directional transmission line 13 starts operation. However, depending on a monitoring method used by the monitoring unit 17, the bi-directional transmission line 13 need not start operation.

In a state in which the composite cable is connected to the power supply apparatus 10 and the power receiving apparatus 50, the subsidiary power supply line 12 is connected to the subsidiary power supply line 52. Thus, in step S12, the subsidiary power is supplied to the subsidiary power supply line 52 through the subsidiary power supply line 12.

Note that, in a case that the composite cable plug front 20 is not connected to the power supply apparatus 10, the subsidiary power supply line 12 is not connected to the subsidiary power supply line 52. Additionally, even in a case that the composite cable plug back 40 is not connected to the power receiving apparatus 50, the subsidiary power supply line 12 is not connected to the subsidiary power supply line 52.

In step S21, the voltage at the subsidiary power supply line 52 increases, and the increased voltage is transmitted through the element 55 to increase the voltage at the main power supply line 51. In this state, the control unit 15 outputs nothing through the main power supply line 11, but a loop is formed between the power lines such that, in the loop, the voltage of the main power supply line 51 increases through the element 55.

In step S22, the detection unit 16 detects, via the composite cable, the voltage of the main power supply line 51 increased in the power receiving apparatus 50. Note that the electrical characteristic detected by the detection unit 16 is not limited to the voltage and that other types of electrical characteristics such as the current, frequency, and phase may be detected.

In step S23, in a case that the result of the detection satisfies a prescribed condition, the detection unit 16 outputs an activation instruction to the control unit 15. For example, in a case that the "voltage of the main power supply line 51" detected via the composite cable is equal to or greater than a prescribed value, the detection unit 16 outputs the activation instruction to the control unit 15. In response to receipt of the activation instruction, the control unit 15 is activated. The activated control unit 15 controls the output of the main power supply line 11 to control the electrical characteristics such as the voltage, current, frequency, and phase of the main power. Note that the control object of the control unit 15 may be some or all of these electrical characteristics.

In step S24, the output (main power) the electrical characteristics of which are controlled by the control unit 15 is supplied to the main power supply line 51 through the composite cable. At this time, the input to the detection unit 16 may change from the point in time in step S22. However, in a simple configuration, the detection unit 16 does not perform an operation for overriding the output of the control unit 15 determined in step S23. On the other hand, when an abnormality occurs in the output of the control unit 15, the detection unit 16 may give another instruction to the control unit 15.

In step S31, the power receiving apparatus 50 is powered on. For powering-on of the power receiving apparatus 50, for example, when the output from the control unit 15 is supplied to the main power supply line 51 via the composite cable, the power receiving apparatus 50 may be immediately powered on. Alternatively, the power receiving apparatus 50 may be powered on under the control of the switch or software. For simple control described below, it is assumed that the Tx of the bi-directional transmission line 53 starts operation. However, depending on the monitoring method used by the monitoring unit 17, the bi-directional transmission line 53 need not start operation.

In step S32, the Tx of the bi-directional transmission line 13 having started operation in step S11 is received as an Rx of the bi-directional transmission line 53 and a Tx of the bi-directional transmission line 53 having started operation in step S31 is received as an Rx of the bi-directional transmission line 13. This establishes bi-directional transmission. In this case, for simple configuration and a reduction in the number of wires, it is assumed that a clock is embedded in the bi-directional transmission line to allow bi-directional transmission that constantly continues operation. However, depending on the monitoring method used by the monitoring unit 17, a separate clock or intermittent bi-directional transmission may be used. Continuing the present step brings the electronic apparatus into a steady state.

In step S41, power for the power receiving apparatus 50 is stopped. The output of the control unit 15 is connected to the main power supply line 51, indicating that the power supply is terminated under the control of the switch or software or due to any abnormality.

In step S42, stopping the power of the power receiving apparatus 50 stops the operation of the bi-directional transmission line 53 to prevent the Rx of the bi-directional transmission line 13 from receiving signals, disconnecting the bi-directional transmission. Here, as an example of disconnection of the bi-directional transmission, disconnection of the bi-directional transmission due to stopping the power of the power receiving apparatus 50 has been described. However, no such limitation is intended, and the bi-directional transmission is also disconnected, for example, in a case that the composite cable slips out of the power supply apparatus 10 or the power receiving apparatus 50.

In step S43, the monitoring unit 17 monitors the bi-directional transmission, and detects the disconnection when the bi-directional transmission is disconnected. In a case that the power for the power supply apparatus 10 is on, the bi-directional transmission line 13 operates. In a case where the power for the power receiving apparatus 50 is on, the bi-directional transmission line 53 operates. The bi-directional transmission remains established so long as the power for the electronic apparatus is on. Various methods are available for monitoring disconnection of the bi-directional transmission. For example, disconnection of the bi-directional transmission may be monitored based on the electrical characteristics of a bi-directionally transmitted signal such as the voltage, current, frequency, and phase. For example, the monitoring unit 17 determines that the bi-directional transmission of the signal has been disconnected in a case that the voltage or current value of the bi-directionally transmitted signal is less than a prescribed value. Additionally, the monitoring unit 17 monitors disconnection of the bi-directional transmission based on the content of the bi-directionally transmitted signal such as a data packet or a sequence.

In step S44, when detecting disconnection of the bi-directional transmission, the monitoring unit 17 outputs a stop instruction to the control unit 15. In response to receipt of the stop instruction, the control unit 15 stops the operation. In other words, in response to receipt of the stop instruction, the control unit 15 controls the output of the main power supply line 11 to control the electrical characteristics of the main power such as the voltage, current, frequency, and phase of the main power, stopping the output. In this case, the control object of the control unit 15 may be some or all of these electrical characteristics.

In step S45, the output of the control unit 15 is stopped, and thus the power supply to the main power supply line 51 of the power receiving apparatus 50 through the composite cable is stopped. Here, in a case that the composite cable is pulled out or pulling-out of the composite cable causes the processing to proceed sequentially through the steps subsequent to step S42 and reach the present step, then only the power supply apparatus 10 is left and the processing proceeds to step S51. On the other hand, in a case that the power supply apparatus 10 and the power receiving apparatus 50 are connected together by the composite cable, the connection between the subsidiary power supply line 12 and the subsidiary power supply line 52 has not been canceled, and the processing proceeds to step S12 in which the main power is supplied again.

In step S51, the power for the power supply apparatus 10 is stopped, and thus the voltage at the main power supply line 11 and the voltage at the subsidiary power supply line 12 decrease. A technique for stopping the power of the power supply apparatus 10 is not limited to a specific technique. For example, stopping the power from the external power source, stopping the power by the switch, or stopping the power by software control may be used to stop the power of the power supply apparatus 10.

Second Embodiment

In the following, a difference between a second embodiment and the first embodiment is described, and it is assumed that the second embodiment is similar to the first embodiment unless otherwise specified. In the first embodiment, the method for controlling the main power has been described on the assumption that the subsidiary power supply line only supplies the subsidiary power from the power supply apparatus to the power receiving apparatus and that the composite cable is a passive cable formed of a metal material such as copper wire.

However, in recent years, active cables that enable long-range communication by amplifying a signal to be transmitted and converting the signal into an optical signal have also been actively developed. In the present embodiment, a configuration will be described in which a subsidiary supply power with an active cable is effectively utilized to simply control the main power.

Figure 5:
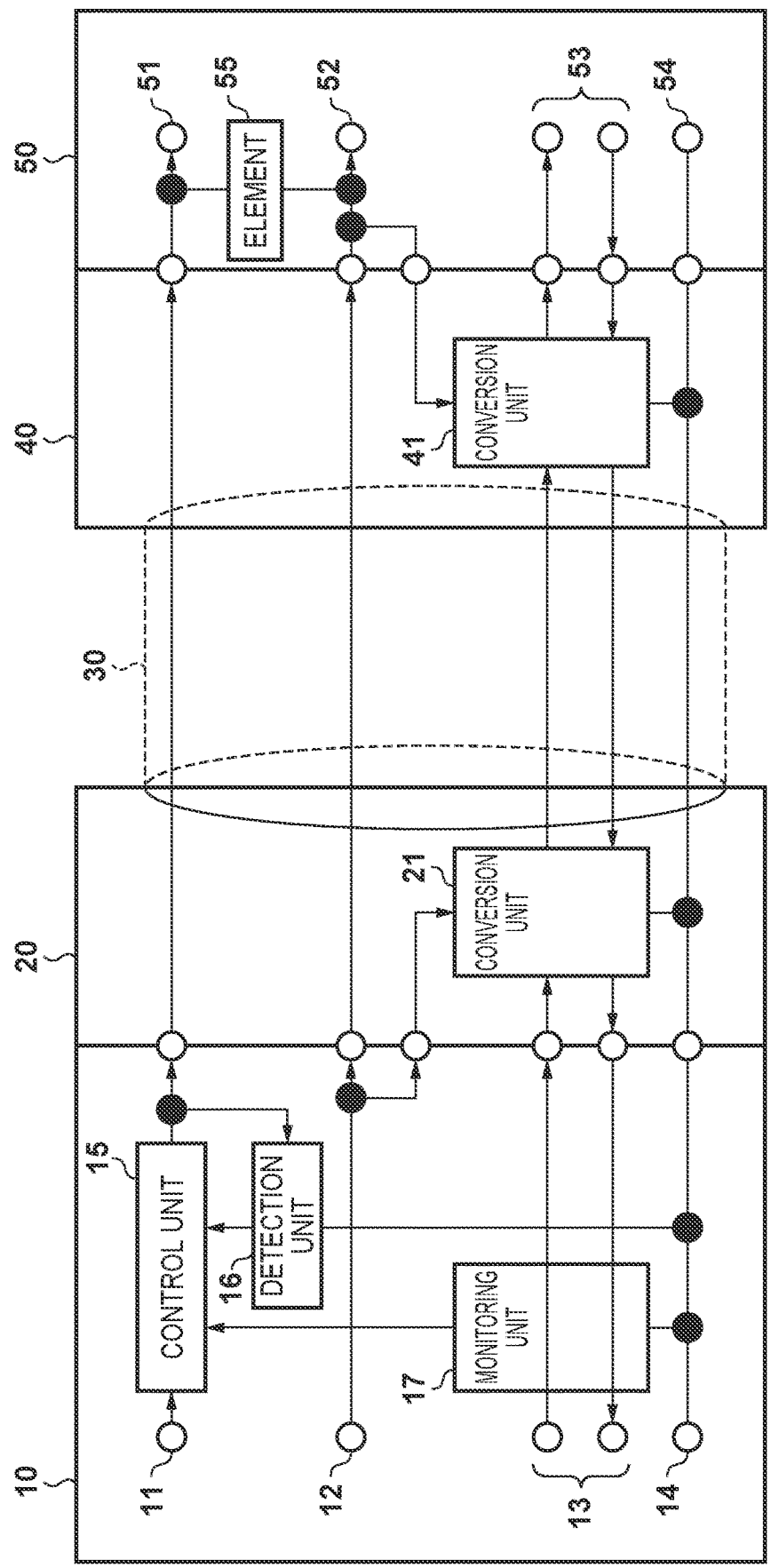
FIG. 5 is a block diagram illustrating a configuration example of the electronic apparatus.

First, a configuration example of an electronic apparatus according to the embodiment will be described, using a block diagram in FIG. 5. In FIG. 5, the same functional units as those illustrated in FIG. 1 are denoted by the same reference numerals as those illustrated in FIG. 1, and descriptions related to the function units are omitted.

The composite cable plug front 20 according to the present embodiment includes a conversion unit 21. The conversion unit 21 operates when the subsidiary power is supplied through the subsidiary power supply line 12 while the composite cable plug front 20 is connected to the power supply apparatus 10 and the power for the power supply apparatus 10 is on. When supplied with the subsidiary power, the conversion unit 21 converts the electrical characteristics of the signal to be transmitted, such as the voltage, current, frequency, and phase, or converts the signal to be transmitted into an optical signal. Each conversion performed by the conversion unit 21 is considered as a technique for achieving long-range transmission. The conversion unit 21 serves to input a signal of the bi-directional transmission line 13 from the power supply apparatus 10 and to guide the signal to the composite cable line 30 and serves to guide the signal from the composite cable line 30 to the power supply apparatus 10 as a signal of the bi-directional transmission line 13. Additionally, depending on the semiconductor of the conversion unit 21, the conversion unit 21 may continue operation as long as the conversion unit 21 receives the power supply, or may start operation in response to input of a signal after receiving the power supply.

Note that the composite cable line 30 is not different in configuration from the composite cable line 30 in the first embodiment but that, depending on the operation of the conversion unit 21, the signal line in the second embodiment is different in material from the signal line in the first embodiment; a metal line such as a copper line is used in the first embodiment, whereas an optical fiber line is used in the second embodiment.

Additionally, the composite cable plug back 40 according to the present embodiment includes a conversion unit 41. When the subsidiary power is supplied from the subsidiary power supply line 52 of the power receiving apparatus 50 to the conversion unit 41, the conversion unit 41 operates similarly to the conversion unit 21, and converts the signal transmitted to the power supply apparatus 10. The content of the conversion by the conversion unit 41 is the same as the content of the conversion by the conversion unit 21.

FIG. 6 illustrates a configuration corresponding to the configuration in FIG. 5 in which only the composite cable plug front 20 is connected upside down. Although the connector pin of the subsidiary power supply line 12 connected from the power supply apparatus 10 to the composite cable is different, the subsidiary power can be supplied from the subsidiary power supply line 12 to the conversion unit 21. Additionally, in the power receiving apparatus 50, the subsidiary power supply line 52 is connected to the element 55 in the same relationship as that in FIG. 5. Here, only the composite cable plug front 20 is coupled upside down, but the same power supply can be achieved even in a case that only the composite cable plug back 40 is coupled upside down or in a case that both the composite cable plug front 20 and the composite cable plug back 40 are coupled upside down. Additionally, it is acceptable to replace the composite cable plug front 20 with the composite cable plug back 40 as described above.

Now, a power control operation performed by the electronic apparatus according to the present embodiment will be described in accordance with a flowchart in FIG. 7. The flowchart in FIG. 7 illustrates that an operation in step S25 is performed in parallel with the operations in steps S21 to S24 in the flowchart in FIG. 4. In FIG. 7, processing steps similar to those illustrated in FIG. 4 are denoted by the same step numbers, and descriptions of the processing steps are omitted.

In step S25, the subsidiary power from the subsidiary power supply line 12 and the subsidiary power supply line 52 is respectively supplied to the conversion unit 21 and the conversion unit 41, each of which starts conversion operation as described above. At this time, as described above for the configuration in FIG. 5, the conversion unit 21 and the conversion unit 41 may continue operation using only power supply, or may operate only when the bi-directional transmission is performed in step S32 after receiving the power supply in the present step.

In this way, according to the present embodiment, even in the active cable, mainly used for long-range transmission, the main supply power can be controlled in a simple configuration, with the subsidiary supply power effectively utilized.

Note that the specific numerical values used in the above description are used to give specific descriptions and are not intended to limit each of the embodiments described above to these numerical values. Additionally, some or all of the embodiments described above may be used in combination as appropriate. In addition, some or all of the embodiments described above may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-167491, filed Sep. 13, 2019, which is hereby incorporated by reference herein in its entirety.

What is claimed is:

1. An electronic apparatus comprising:
    a composite cable line configured to supply an external apparatus with main power and subsidiary power and to perform bi-directional signal transmission with the external apparatus;
    a detection unit configured to detect electrical characteristics of the main power, via the composite cable line, that are changed in accordance with the subsidiary power when the subsidiary power is supplied through the composite cable line without supplying the main power; and
    a control unit configured to control supply of the main power to the external apparatus through the composite cable line and the electrical characteristics of the main power based on the detected electrical characteristics of the main power.

2. The electronic apparatus according to claim 1, wherein the composite cable line includes a main power supply line and a subsidiary power supply line, and
    wherein the detection unit is configured to detect the electrical characteristics of the main power in the main power supply line when the subsidiary power is supplied through the subsidiary power supply line.

3. The electronic apparatus according to claim 1, further comprising a monitoring unit configured to monitor a transmission status of a bi-directional signal via the composite cable line,
    wherein the control unit is configured to further control the main power supplied through the composite cable line based on the monitored transmission status of the bi-directional signal via the composite cable line.

4. The electronic apparatus according to claim 3, further comprising a unit configured to convert electrical characteristics of the bi-directional signal.

5. The electronic apparatus according to claim 3, further comprising a unit configured to convert the bi-directional signal into an optical signal.

6. The electronic apparatus according to claim 1, wherein the electrical characteristics include at least one of a voltage, a current, a frequency, and a phase.

7. A control method for an electronic apparatus having a composite cable line configured to supply an external apparatus with main power and subsidiary power and to perform bi-directional signal transmission with the external apparatus, the method comprising:
    detecting electrical characteristics of the main power, via the composite cable line, that are changed in accordance with the subsidiary power when the subsidiary power is supplied through the composite cable line without supplying the main power; and
    controlling the main power supplied to the external apparatus through the composite cable line and the electrical characteristics of the main power based on the detected electrical characteristics of the main power.

* * * * *